(No Model.)

R. HYMERS.
AUTOMATIC HORSE TIE.

No. 376,803. Patented Jan. 24, 1888.

Attest
A. Edmunds
Carl Hayden

Inventor
Robert Hymers
By P. J. Edmunds
Attorney

UNITED STATES PATENT OFFICE.

ROBERT HYMERS, OF LONDON, ONTARIO, CANADA.

AUTOMATIC HORSE-TIE.

SPECIFICATION forming part of Letters Patent No. 376,803, dated January 24, 1888.

Application filed May 4, 1887. Serial No. 237,144. (No model.)

*To all whom it may concern:*

Be it known that I, ROBERT HYMERS, a subject of the Queen of Great Britain, and a resident of London, in the Province of Ontario, Canada, have invented a new and Improved Automatic Ratchet Horse-Tie, of which the following is a specification.

This invention relates to a device, preferably attached to the wheel of a vehicle, in which the lines are rigidly and firmly secured for the purpose of tying the horse or team, the object being to permit the horse or team attached to the vehicle to move backward, but on the slightest movement forward the lines will be tightened to check or restrain and instantly stop the horse or team; and it consists of the improved construction and combination of parts of the same, as will be hereinafter more fully described and claimed, reference being had to the accompanying drawings, wherein—

Figure 1:
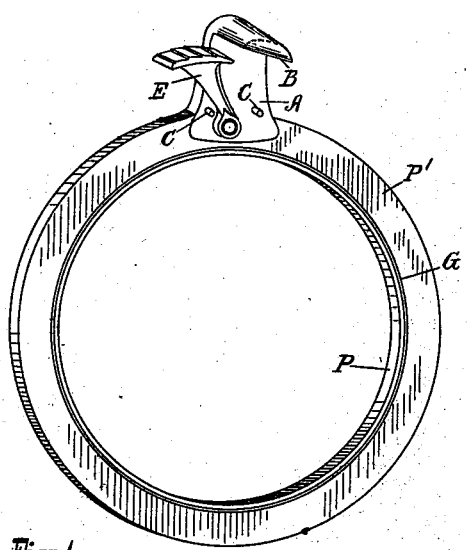
Figure 2:
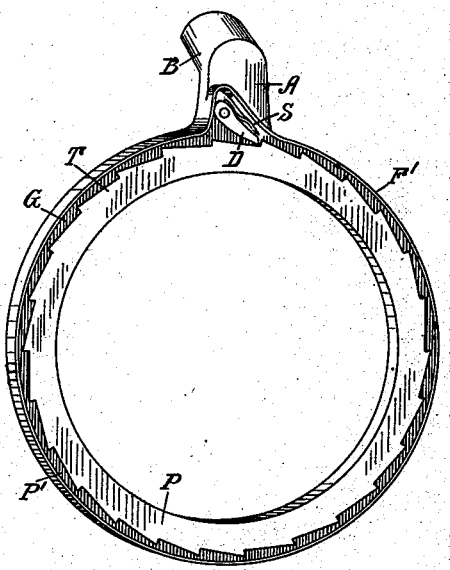
Figure 3:
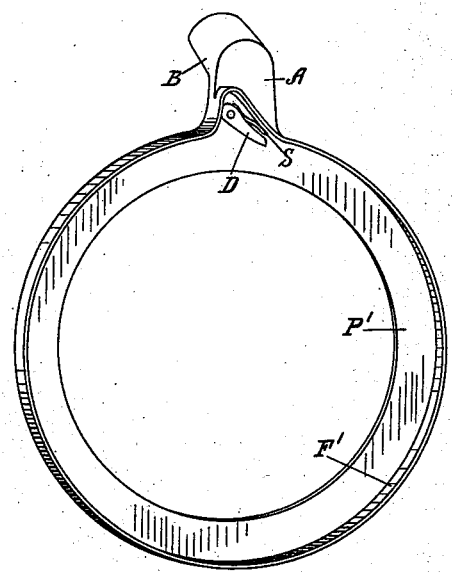
Figure 4:
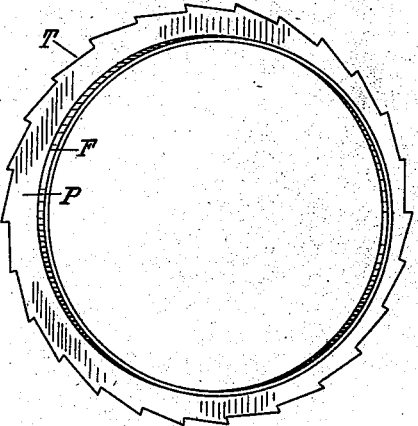

Figure 1 is a front perspective view of a device embodying my invention. Fig. 2 is a rear view of same. Figs. 3 and 4 are enlarged detail perspective views of the ring-plates forming part of this invention.

P P' designate plates constructed of any suitable size or shape and of metal or other suitable material; but they are preferably constructed in ring form, as shown in accompanying drawings, and they may be secured to any part of the wheel; but they are preferably secured to the wheel or hub, so that they will encircle the latter. The ring-plate P is formed with a ratchet, T, and with a flange, F, and this plate P may be formed integral with a ring or collar encircling the hub, or may be attached to the hub or to the spokes of the wheel by any suitable securing devices. The ring-plate P' is formed with a flange, F', and a dog, D, is pivoted on this plate P'; and S is a spring acting upon said dog D, to keep the latter engaged with the teeth of the ratchet T when the ring-plates P P' lie close together when properly adjusted.

B is a boss or stud projecting outward from an arm, A, rigidly secured to or formed integral with the plate P'.

E is an eccentric-grip pivoted on the ring-plate P' and adjusted to bind the lines between it and the boss or stud B. This eccentric-grip E is preferably serrated or roughened on the upper face to take a better grip on the lines when binding them between it and the boss or stud B.

C are pins which limit the movement of the eccentric-grip, permitting the latter to move only sufficient to release or firmly secure the lines when required.

G designates a packing of rubber, cork, or other suitable material placed between the rings P P', to prevent them from rattling or making a noise of any kind when the vehicle (to the wheel of which they are attached) is passing over a rough or uneven road.

When constructed as shown in the accompanying drawings, this invention may be held together and to the hub or wheel by any suitable securing devices; but it is preferably secured to the wheel by first rigidly securing the ring-plate P around the hub and then placing the ring-plate P' thereon, as shown in Fig. 1 or 2, and then placing another ring provided with a flange or a bracket provided with an arm in proper position, so that the flange or arm would overlap both of these ring-plates P P', and then securing the latter flanged ring to the hub or wheel the ring-plates P P' would be held together and to the hub, yet the ring-plate P' would be permitted to revolve on the ring-plate P, and this is limited by the dog D engaging with the ratchet T to one direction— that is, when the lines are secured therein. When the lines are not secured to this device, it revolves perfectly free with the wheel.

The ring-plate P' is held in place by and revolves on the flange F of the plate P, the flange F' on the plate P' being for the purpose of preventing mud or dirt of any kind getting in between the rings P P' or ratchet T and dog D to prevent their operation.

When the eccentric-grip E is in the position shown in Fig. 1, the lines are placed between it and the boss or stud B. Then by pressing the eccentric-grip E up toward the boss or stud B they are rigidly bound to the plate P'. When the lines are in this position and the horse or team commences to move forward, the instant they commence to move the wheel begins to turn, as well as the ring-plates P P', and as they revolve the lines are tightened, which checks and stops the horse or team. The ring-plates P P' revolve together in this case as the dog D engages with the ratchet T;

but if the horses should back the ring-plate P' remains stationary and the plate P only revolves with the wheel, because when moving in this direction the dog D rides over the teeth of the ratchet T.

Having thus described my invention, what I claim as new, and desire to secure by Letters Patent, is—

1. The plate P', formed with a boss or stud, B, and an eccentric-grip, E, pivoted on said plate, in combination with a plate, P, formed with a ratchet, T, a dog, D, and spring S, substantially as shown and described, and for the purpose specified.

2. The plate P', formed with a boss or stud, B, and an eccentric-grip, E, pivoted on said plate, and pins C C, in combination with the plate P, formed with a ratchet, T, a dog, D, and spring S, substantially as shown and described, and for the purpose specified.

3. The plate P', formed with a boss or stud, B, and an eccentric-grip, E, pivoted on said plate, and pins C C, in combination with the plate P, formed with a ratchet, T, packing G, dog D, and spring S, substantially as shown and described, and for the purpose specified.

In testimony whereof I affix my signature in the presence of the two undersigned witnesses.

ROBERT HYMERS.

Witnesses:
    P. J. EDMUNDS,
    A. EDMUNDS.